M. SMITH.

Assignor, by direct and mesne assignments, of two-thirds to A. H. SMITH and V. P. RICHARDSON.

TOBACCO TRANSPLANTER.

No. 10,982. Reissued Jan. 29, 1889.

Witnesses,
L. F. Mann,
C. C. Linthicum.

Inventor
Maurice Smith
By, Offield & Towle, Att'ys.

N. PETERS, Photo-Lithographer, Washington, D. C.

UNITED STATES PATENT OFFICE.

MAURICE SMITH, OF JANESVILLE, WISCONSIN, ASSIGNOR, BY DIRECT AND MESNE ASSIGNMENTS, OF TWO-THIRDS TO A. HYATT SMITH AND VICTOR P. RICHARDSON, OF SAME PLACE.

TOBACCO-TRANSPLANTER.

SPECIFICATION forming part of Reissued Letters Patent No. 10,982, dated January 29, 1889.

Original No. 335,724, dated February 9, 1886. Application for reissue filed May 7, 1887. Serial No. 237,490.

*To all whom it may concern:*

Be it known that I, MAURICE SMITH, a citizen of the United States, residing at Janesville, in the county of Rock and State of Wisconsin, have invented a certain new and useful Machine for Transplanting Tobacco and other Plants, which I desire to protect by Letters Patent of the United States, and of which the following is a specification.

My invention relates to a machine for transplanting such plants as tobacco and cabbage, in which a plow, as hereinafter described, makes a suitable opening for the plant, into which the plants are placed by two droppers, (boys,) who sit both sides of the plow and, in connection with a scraper and three several and independent rollers, carefully fill in and press the mold about the roots of the plant; also, by means of a tank of water on the machine, attached with a pipe or hose and valve, sufficient water can be poured about the plant, as it is set, to insure its growth in dry soil in dry weather.

The objects of my invention are, first, to secure a machine that will set the plants and avoid the present backaching process of stooping over; second, to provide a means for setting a greater number of plants with a less number of hands; third, to save expense in setting plants; fourth, to provide a means of setting without previous "marking," so as to save labor; fifth, to provide a means for setting plants in dry weather, so as not to delay the planting for rain, which sometimes makes the crop so late that it gets killed by the frost; sixth, to provide a means to set plants in freshly-opened soil. I attain these objects by the machine illustrated in the accompanying drawings, in which—

Figure 1:
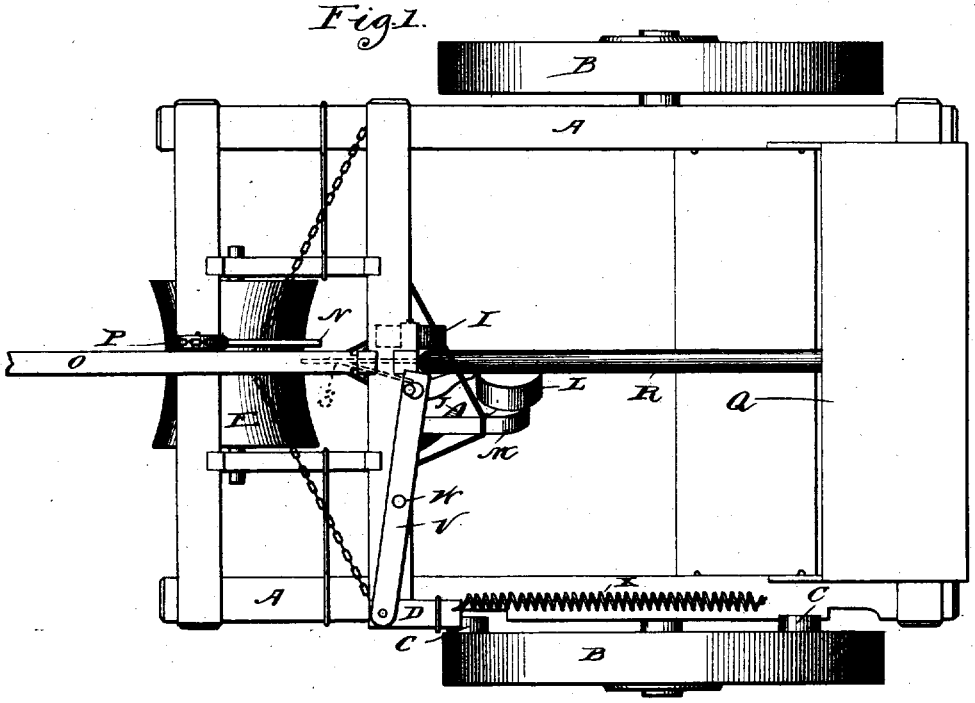
Figure 2:
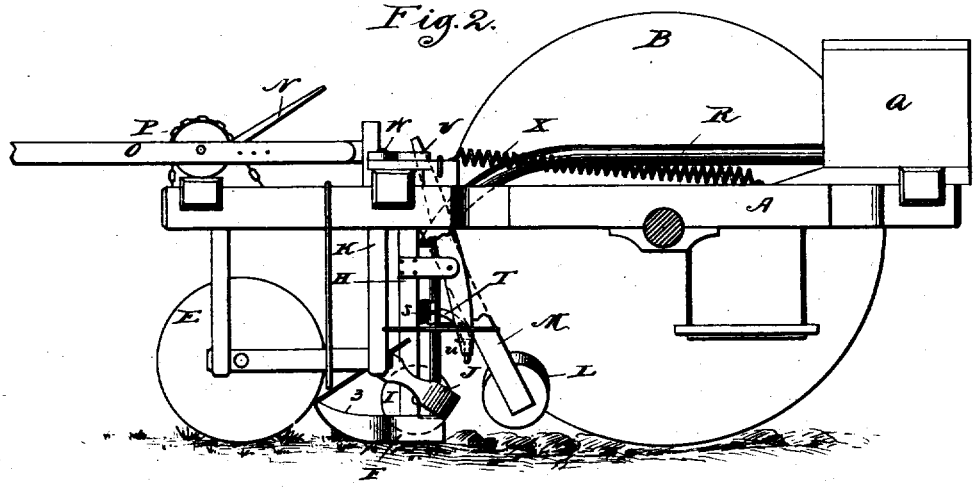
Figure 3:
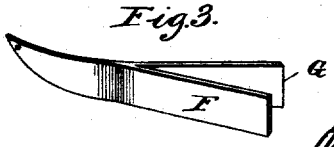

Figure 1 is a top view of the machine ready for work. Fig. 2 is a side view with one wheel removed. Fig. 3 is a view of the plow detached.

Similar letters refer to similar parts throughout the several views.

I now proceed to explain Fig. 1. A A A show the main frame of the machine, supported on the drive-wheels B B, upon the inside of one of which drive-wheels, about four inches from the rim, are lugs or cams C, with other side more curved than the circumference of the wheel, for the purpose of pushing the slide-bar D forward to work the lever V, for the uses and purposes hereinafter set forth.

E is a concave roller attached to the frame A in front to bear the weight of the droppers and pulverize the soil.

3 is a plow about fifteen inches in length, having an upright or perpendicular moldboard, F, attached to a straight upright landside, G, that is parallel with the side of frame A about seven inches from the point of the plow, and diverging backward at an angle of about twenty-seven degrees, so as to leave a space of about two inches between the moldboard and landside at their heel, making a furrow of about two and one-fourth inches wide, with a perpendicular bank on the land side. Said plow is attached to a standard, H, which is attached to the center of the crossbeam of the frame A. On the bank or land side of the standard H a roller, I, is attached, so as to be within about three inches of the bottom of the plow, which roller, with said landside of said plow, compresses said perpendicular wall of the furrow, and against which said perpendicular wall the plants are placed, with roots properly downward, by the droppers just at the end of the landside hereinbefore described; also, on the mold side of the plow a scraper, J, for the purpose of filling the furrow already described, is attached to the frame K of the roller E and reaches inward to the center and in front of a roller, L, which is attached by an arm, M, to the crossbeam of the frame A, which said roller L follows the scraper J and compresses the soil scraped into the furrow and completes the process of setting the plants. A lever, N, pivoted to the tongue O of the planter and connected by a chain, P, to the frame A, raises the plow out of the ground.

In connection with said apparatus just described, and as a necessary part thereof, is a water-tank, Q, set on top of the frame A, with a pipe or hose, R, reaching to the foot of the standard H, secured by a valve, S, which is regulated by an oscillating lever, T, moving on a hinge or pin, U. The upper end of the lever T articulates with the end of a lever, V, that oscillates on its center on a pin, W, and at its outside end articulates with the slide-bar D. The slide-bar D is drawn backward by a spiral spring, X, which, by means of the levers just described, shuts the valve S until the lug or cam C comes around and pushes the slide-bar D forward, which opens the valve and deposits the water with the plant.

What I claim as my invention, and desire to secure by Letters Patent, is—

1. In a transplanting-machine, the combination of a plow for opening the furrow, a scraper for throwing loose earth over the roots of the plant, and a roller for pressing the earth after it has been thrown in, with a watering attachment comprising a tank carried upon the machine, and a pipe to deliver the water from the tank to the furrow as the plant is set, substantially as described.

2. In a transplanting-machine, the combination of a plow for opening a furrow, a scraper to fill the furrow, and a roller to compact the earth about the plant, with a watering-tank carried by the machine, a delivery-pipe for conducting the water therefrom to the plant, a valve in said pipe, and mechanism connecting said valve and a moving part of the machine, whereby water is delivered to the plant at regular intervals as the machine moves forward, substantially as described.

MAURICE SMITH.

Witnesses:
H. C. RICHARDSON,
M. L. PETERSON.